(12) United States Patent
Adamek et al.

(10) Patent No.: US 6,203,047 B1
(45) Date of Patent: Mar. 20, 2001

(54) DEVICE FOR STABILIZING THE TWO LOWER STEERING ARMS OF A TRACTOR

(75) Inventors: Wolfgang Adamek, Lohmar; Heinrich Henseler, Königswinter; Kurt Kirschbaum, Lohmar, all of (DE)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 09/412,678

(22) Filed: Oct. 5, 1999

(30) Foreign Application Priority Data

Oct. 6, 1998 (DE) .............................. 198 45 968

(51) Int. Cl.⁷ .......................... A01B 63/102; B60D 1/01
(52) U.S. Cl. ...................... 280/455.1; 172/445; 172/450
(58) Field of Search .................... 172/439, 442, 172/444, 445, 450 I, 445.2, 677, 680; 180/53.3; 280/455.1

(56) References Cited

U.S. PATENT DOCUMENTS

| | | | |
|---|---|---|---|
| 3,425,715 | * 2/1969 | Weitz | 280/479 |
| 4,862,971 | * 9/1989 | Azzarello et al. | 172/450 |
| 4,865,134 | * 9/1989 | Rugen et al. | 172/450 |
| 4,909,331 | * 3/1990 | Defranco | 172/4 |
| 5,361,850 | * 11/1994 | Muller et al. | 172/450 |
| 5,462,303 | * 10/1995 | Langen et al. | 280/455.1 |
| 5,601,146 | * 2/1997 | Schlegel et al. | 172/439 |
| 5,697,454 | * 12/1997 | Wilcox et al. | 172/447 |
| 6,089,328 | * 4/2000 | Moore et al. | 172/447 |
| 6,131,937 | * 10/2000 | Coenen | 280/455.1 |

FOREIGN PATENT DOCUMENTS

| | | |
|---|---|---|
| 196 11 626 A1 | 11/1997 | (DE) . |
| 195 37 555 C2 | 4/1998 | (DE) . |
| WO 95/20311 | 8/1995 | (WO) . |

* cited by examiner

*Primary Examiner*—Daniel G. DePumpo
*Assistant Examiner*—J. Allen Shriver
(74) *Attorney, Agent, or Firm*—Harness, Dickey & Pierce, P.L.C.

(57) ABSTRACT

A device for stabilizing the two lower steering arms (1) of a tractor, with the lower steering arms (1) actuated by a hydraulically operated power lever (9). The arms are each associated with a side strut (6) with a first single-acting hydraulic cylinder (7) for stabilizing and fixing purposes. A line connection between the first single-acting hydraulic cylinders (7) and the power lever (9) can be effected by a control valve (13). In order to center the lower steering arms (1) and set the arm to a pre-determined dimension of spread, even when no implement is attached, the line (14) which leads to the second single-acting hydraulic cylinder (10) of the power lever (9) contains a pressure-controlled first return valve. A bypass line (21) with a second return valve (22) is provided to lock in the direction opposite to that of the first return valve.

4 Claims, 1 Drawing Sheet

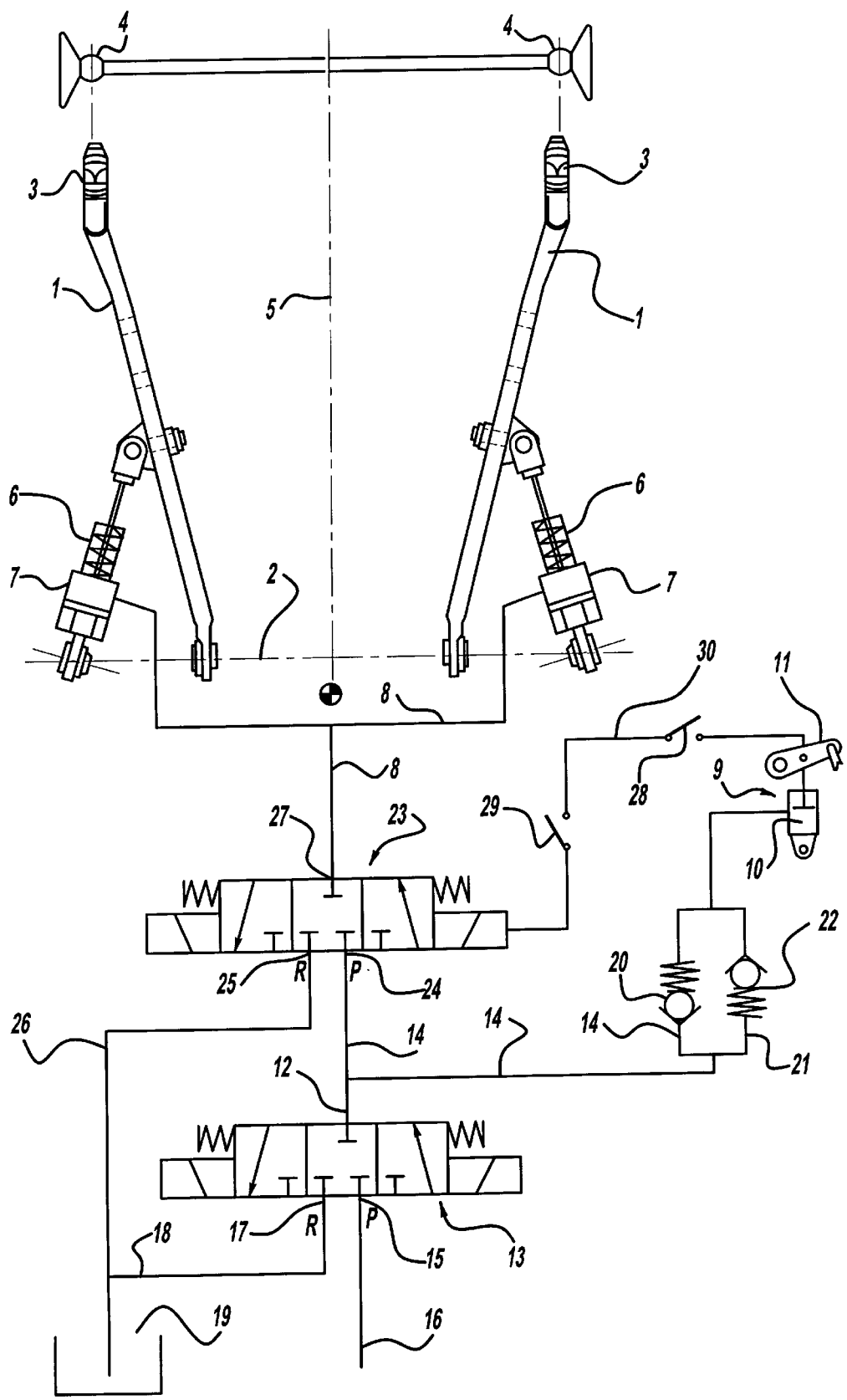

DEVICE FOR STABILIZING THE TWO LOWER STEERING ARMS OF A TRACTOR

CROSS-REFERENCE TO RELATED APPLICATION

This application is based upon and claims priority to German Patent Application 198 45 968.8 filed Oct. 6, 1998.

BACKGROUND OF THE INVENTION

The invention relates to a device for stabilizing the two lower steering arms of a tractor. The arms are actuatable by a hydraulically operated power lever. The lever has a side strut per lower steering arm. Each side strut includes a first single-acting hydraulic cylinder. The cylinder has a switching assembly which enables the two first single-acting hydraulic cylinders of the side struts to be connected to the hydraulically operated power lever. The connection has a mechanism for jointly separating the two first single-acting hydraulic cylinders hydraulically from the power lever. Also, a control establishes the connection as soon as a settable pivot position of the lower steering arms has been achieved.

In DE 195 37 555 A1, for example, the supply of the hydraulic cylinders of the side struts takes place in parallel with the supply of the hydraulic power lever. The hydraulic power lever adjusts the lower steering arms. This means that the lower steering arms are centered centrally as a function of the lifting force and position. Stabilization only takes place while the lower steering arms are being lifted. The position switch ensures that, during the lowering operation, the hydraulic cylinders of the side struts and the hydraulic power lever are jointly connected to the return line. When work is carried out on a slope, the resulting downward-directed forces cause the attached implement to assume an inclined position. Furthermore, the lower steering arms cannot be set or cannot be reliably set to the respective dimension of spread. This is due to the fact that the hydraulic cylinders cannot apply an effective force to the lower steering arms while being raised unless an implement is received at the lower steering arms.

SUMMARY OF THE INVENTION

It is an object of the present invention to improve the device. Accordingly, when operating the hydraulic power lever, in the raising sense, adjustment and centering of the lower steering arms takes place relative to the longitudinal axis of the tractor. This occurs even in those cases where no implement is received at the lower steering arms.

In accordance with the invention, a control valve is coupled with the connecting line common to the two first single-acting hydraulic cylinders and with a line which leads to a second single-acting hydraulic cylinder associated with the power lever. The control valve has three ports. The first port serves to establish a line connection with the line leading to the second single-acting hydraulic cylinder. The second port provides a connection with the return line leading to the tank. The third port establishes a connection with the connecting line. A first pressure-controlled return valve is in the line leading to a second single-acting hydraulic cylinder behind the line connection with the switching valve. When a pre-determined pressure value is exceeded, the first pressure-control return valve opens in the direction of the second single-acting hydraulic cylinder. The valve closes in the opposite direction. A second return valve is provided in a bypass line leading to the first return valve. The second valve closes in the direction of the second single-acting hydraulic cylinder and opens in the opposite direction. The control valve is designed to assume three switching positions. All ports are disconnected from one another in the first position. The first port is connected to the third port in the second position. The third port is connected to the second port in the third position.

An advantage of this design is that when pressure is applied by the pressure-controlled return valve, a counter pressure builds which is of a sufficiently high pressure in the first single-acting hydraulic cylinders of the side struts to center the lower steering arms. The control valve connects the first single-acting hydraulic cylinders to the pressure source or to the return line. According to a further embodiment of the invention, the first return valve opens at a pressure of $\geq 10$ bar. The counter pressure of at least 10 bar, generated in this way, is sufficient to securely set the lower steering arms.

To ensure that it is possible to separate the two first single-acting hydraulic cylinders jointly from the pressure supply and the return line, the control valve is transferred into the first position. A main switch is incorporated in a control line to actuate the control valve. In the open condition, the control valve is actuated to assume its first position.

Furthermore, a position switch is incorporated in the control line containing the main switch. The position switch closes the power circuit only after the lower steering arms have assumed a pre-determined pivot position. The position switch also ensures that, when a pre-determined pivot position has been exceeded, the control valve is actuated to assume a second position. If, starting from the above-mentioned position, the pre-determined pivot position is not reached or if, when the main switch is closed, it is found that the pre-determined pivot position (distance from the ground) has not been reached, the control valve is actuated to assume a third position.

From the following detailed description, taken in conjunction with the drawings and subjoined claims, other objects and advantages of the present invention will become apparent to those skilled in the art.

BRIEF DESCRIPTION OF THE DRAWING

An embodiment of the invention is diagrammatically illustrated in the drawing and explained in greater detail with reference thereto.

DETAILED DESCRIPTION OF THE PREFERRED EMBODIMENT

The drawing shows the two lower steering arms which are arranged at a lateral distance from the longitudinal axis 5 of a tractor. At one end, the arms are pivotable around a pivot axis 2 at the rear of the tractor. The free ends of the arms carry coupling hooks 3. The hooks 3 approach the ground on which the tractor is positioned or can be moved away therefrom. The coupling hooks 3 at the steering arm ends serve to be connected to suitable coupling means 4 of an implement (not shown in detail). The implement is carried by the lower steering arms 1.

The side struts 6 are provided to delimit the lateral movement of the two lower steering arms 1. At one end, the side struts 6 are connected to the lower steering arm 1. At the other end, the side struts are pivotably connected to a fixing point positioned on the pivot axis 2 and arranged at the tractor. The two side struts 6 have first single-acting hydraulic cylinder 7. The first single-acting hydraulic cylinders are jointly connected to a connecting line 8.

To adjust the height of the two lower steering arms 1, a hydraulically operated power lever 9 is provided. The lever 9 has two power arms 11 which are displaced in accordance with the distance of the lower steering arms 1. The arms 11 are jointly pivotable around an axis. Each arm carries a lifting strut which is connected to the associated lower steering arm 1. To actuate the power arm, the power lever 9 is associated with a second single-acting hydraulic cylinder 10. The cylinder chamber of the second cylinder 10, at the piston end, can be connected via a line 14 to a first port 12 of a switching valve 13.

The switching valve 13 includes a second port 15 which receives a pressure line 16. The line 16 is fed with a pressurized fluid by a pressure source P. A third port 17 of the switching valve 13 is connected to a pressure-less return line 18, which leads to a tank 19. In the switching position as illustrated, the switching valve 13 is in the locked position. In the second switching position, the pressure line 16 is connected to the line 14 which leads to the second single-acting hydraulic cylinder 10. Also, the connection with the return line 18 is closed. In the third switching position, the first port 12 is connected to the port 17, which leads to the return line 18. Likewise, the pressure line 16 is closed. A pressure-controlled return valve 20 is arranged in the line 14 which leads to the second single-acting hydraulic cylinder 10.

The return valve 20 is switched on in the direction of the second single-acting hydraulic cylinder 10 only after a pre-determined pressure of $\geq 10$ bar, for example, has been exceeded. A corresponding pressure is built up in the portion of the line 14 positioned in front of the first return valve 20. The first return valve 20 blocks the line 14 for pressurized fluid from the second single-acting hydraulic cylinder 10 in the direction of the switching valve 13. A bypass line 21 is provided to bypass the first return valve. The bypass line is connected at both ends to the line 14. A second return valve 22 is arranged in the bypass line 21. The second return valve 22 is locked in the direction of the second single-acting hydraulic cylinder 10. The second return valve 22 is open in the direction of the switching valve 13. The pressure at which the second return valve 22 opens is considerably below that of the first return valve 20. The pressure is $\leq 0.1$ bar.

The line 14 also leads to a first port 24 of a control valve 23. The control valve 23 includes a second port 25 which can be connected to a return line 26 which leads to the tank 19. The control valve 23 has a third port 27. The third port is connected to the connecting line 8 which leads to the two first single-acting hydraulic cylinders 7. The control valve 23 can assume three switching positions. In the basic position as illustrated, all ports 24, 25, 27 are locked. The two first ports 24, 25 are separated from the third port 27 which leads to the connecting line 8. In the second switching position, the first port 24 is connected to the third port 27, which leads to the connecting line 8. The second port 25 leads to the return line 26 and is locked. In the third switching position, the first port 24 is locked. The third port 27, coupled with connecting line 8, is connected to the second port 25, which leads to the return line 26.

The control valve 23 can be actuated electromagnetically. Accordingly, a control power circuit is provided, of which only a control line 30 is shown, which leads from a position switch 28 associated with the power lever 9 to the control valve 23. Furthermore, the control line 30, which leads to the control valve 23, includes a main switch 29. Through the main switch 29, the control valve 23 can be automatically switched off or on by the position switch 28. When the main switch 29 is open, the control valve 23 automatically assumes the first switching position (locking position). The position switch 28 records the respective pivot position of the lower steering arms 1, which corresponds to the respective height position of the coupling hook 3 relative to the ground. The position switch 28 records whether the pre-determined position relative to the distance from the ground has been exceeded or not reached.

The control valve 23 is transferred into a position in which the first port 24 of the control valve 23 is connected to the third port 27, and thus to the connecting line 8, when actuating the switching valve to adjust the lower steering arms in the raising sense. Also, in this position, the second port 15 of the switching valve 13 is connected to the first port 12 and thus to line 14. Further, a set pressure of the first return valve 20 is exceeded and the main switch 29 is in the closed position. Also, it is determined whether the pre-determined pivot position of the lower steering arms has been reached or exceeded.

The first single-acting hydraulic cylinders 7 of the side struts of both lower steering arms 1 are pressure-loaded. Thus, when the implement is attached, the position of struts is stabilized relative to the longitudinal axis 5. The struts are also centered relative to the longitudinal axis 5.

The same applies to set the lower steering arms to the dimension of spread. Here, the first single-acting hydraulic cylinders 7 are fully moved out.

If the pivot position as set is not reached, the control valve 23 is transferred into a position where the third port 27 is connected to the second port 25. Also, it is connected to the return line 26, which leads to the tank 19. In this position, the lower steering arms 1 can freely carry out side movements. Additionally, when the main switch 29 is open, the control valve 23 can be selectively actuated manually.

When the main switch 29 is open, the control valve 23 assumes the locked position as shown automatically. This means that when actuating the switching valve 13 with the main switch 29 in the open position, only the lower steering arms 1 can be actuated by the power lever 9. When the main switch 29 is opened after the first single-acting hydraulic cylinders 7 have been pressure-loaded, when the two first single-acting hydraulic cylinders 7 are in the moved-out position, the cylinders 7 are separated from the pressure fluid supply source and the lower steering arms 1 remain centered.

The pressurized fluid flows back from the second single-acting hydraulic cylinder 10 through the return valve 22 in the bypass line 21 when the lower steering arms 1 are lowered.

While the above detailed description describes the preferred embodiment of the present invention, the invention is susceptible to modification, variation and alteration without deviating from the scope and fair meaning of the subjoined claims.

What is claimed is:

1. A device for stabilizing two lower steering arms of a tractor which are actuatable by a hydraulically operated power lever, comprising:
   a side strut per lower steering arm, said side struts each include a first single-acting hydraulic cylinder;
   a switching assembly enabling the two first single-acting hydraulic cylinders of the side struts to be connected line-wise to the hydraulic power lever, a connection containing means for jointly separating the two first single-acting hydraulic cylinders hydraulically from the power lever;

a connecting line common to the two first single-acting hydraulic cylinders for connecting with a second line which leads to a second single-acting hydraulic cylinder associated with the power lever;

a control valve with three ports, a first port serves for establishing a line connection with the second line leading to the second single-acting hydraulic cylinder, a second port providing a connection with a return line leading to a tank and a third port establishing a connection with the first connecting line;

a first pressure-controlled return valve in the second line leading to the second single-acting hydraulic cylinder of the power lever behind the line connection with the switching assembly, when a pre-determined pressure is exceeded, said first pressure-controlled return valve opens in the direction of the second single-acting hydraulic cylinder and closes in the opposite direction;

a bypass line leading to the first return valve, a second return valve in said bypass line, said second return valve closes in the direction of the second single-acting hydraulic cylinder and opens in the opposite direction;

and said control valve designed to assume three switching positions, with all ports being disconnected from one another in a first position, the first port being connected to the third port in a second position and the third port being connected to the second port in a third position.

2. A device according to claim 1, wherein the first return valve opens at a pressure of greater than or equal to 10 bar.

3. A device according to claim 1, wherein a control line includes a main switch for actuating the control valve, said main switch, when in the open condition, ensures that the control valve assumes its first position.

4. A device according to claim 3, wherein the control line additionally includes a settable position switch which records the respective pivot positions of the lower steering arms and closes the control line only after the pre-determined pivot position has been reached and causes actuation of the control valve so that it assumes the second position when a pre-determined pivot position has been exceeded, and a third position when the pre-determined pivot position relative to the ground has not been reached.

\* \* \* \* \*

UNITED STATES PATENT AND TRADEMARK OFFICE
CERTIFICATE OF CORRECTION

PATENT NO. : 6,203,047 B1
DATED : March 20, 2001
INVENTOR(S) : Wolfgang Adamek, Heinrich Henseler and Kurt Kirschbaum It is certified that error appears in the above-identified patent and that said Letters Patent is hereby corrected as shown below:

Column 2,
Line 16, "$\geqq$" should be -- $\geq$ --.

Column 3,
Line 31, "$\geqq$" should be -- $\geq$ --.
Line 44, "$\leqq$" should be -- $\leq$ --.

Signed and Sealed this

Third Day of September, 2002

Attest:

JAMES E. ROGAN
Attesting Officer    Director of the United States Patent and Trademark Office